United States Patent [19]

Dusserre-Telmon et al.

[11] Patent Number: 5,749,660
[45] Date of Patent: May 12, 1998

[54] BEARING ASSEMBLY WITH DYNAMIC DRAINAGE SUPPLIED WITH LUBRICANT

[75] Inventors: Guy Franck Paul Dusserre-Telmon, Sivry-Courtry; Daniel Georges Plona, Vulaines Sur Seine; Christophe Yvon Gabriel Tourne, Montgeron, all of France

[73] Assignee: Societe Nationale d'Etude de Contruction de Moteurs d'Aviation "Snecma", Paris, France

[21] Appl. No.: 727,041

[22] Filed: Oct. 8, 1996

[30] Foreign Application Priority Data

Oct. 18, 1995 [FR] France .................... 95 12204

[51] Int. Cl.⁶ .................... F16C 33/58
[52] U.S. Cl. .................... 384/475
[58] Field of Search .................... 384/475, 474, 384/516, 513, 569

[56] References Cited

U.S. PATENT DOCUMENTS

| | | |
|---|---|---|
| 2,280,659 | 4/1942 | Muller . |
| 3,195,965 | 7/1965 | Van Dorn . |
| 4,334,720 | 6/1982 | Signer . |
| 5,183,342 | 2/1993 | Daiber et al. . |

FOREIGN PATENT DOCUMENTS

| | | |
|---|---|---|
| 0 034 084 | 8/1981 | European Pat. Off. . |
| 94/21932 | 9/1994 | WIPO .................... 384/475 |
| WO 94/21932 | 9/1994 | WIPO . |

*Primary Examiner*—Lenard A. Footland
*Attorney, Agent, or Firm*—Oblon, Spivak, McClelland, Maier & Neustadt, P.C.

[57] ABSTRACT

A bearing assembly having dynamic drainage for lubrication oil which includes rings which are provided with races with a conical-shaped cross-section which the balls contact at pairs of side contact points. The central circumference of each ring is free; cooling oil drillings are drilled in it. This arrangement gives better oil circulation characteristics, thus improving the bearing efficiency and less heat is dissipated. Thus higher speed can be expected. The drillings responsible for drainage are inclined in the direction of rotation in order to facilitate drainage outside the roller bearing.

9 Claims, 8 Drawing Sheets

BEARING ASSEMBLY WITH DYNAMIC DRAINAGE SUPPLIED WITH LUBRICANT

DESCRIPTION

This invention relates to a bearing, particularly to a ball bearing or a roller bearing assembly supplied with a lubricant by continuous oil circulation.

DISCUSSION OF THE BACKGROUND

Bearings have been used currently in all technical sectors for more than a century and generally give complete satisfaction, but they do have limits which become obvious when high performances are required. This happens in aeronautics where very long service durations, high rotation speeds and low power dissipation are required for turbojet rotor shaft support bearings. Ball bearings are usually used to resist axial loads and roller bearings are used to resist radial loads. But the aeronautics market is quite small, and this is why manufacturers have not made special efforts to solve problems specific to this sector. They are usually satisfied with using special steels and offering elements, rings and balls machined to a better precision than for ordinary applications so that the higher requirements can be satisfied; the result is that the price of a bearing for an aeronautical application is about ten times higher than the price for a normal quality bearing.

Another serious problem in aeronautics is caused by temperature increases, which are such that ordinary lubrication by injection of grease at specific maintenance periods is insufficient since this grease will quickly decompose. Therefore dynamic lubrication is used in which the lubricant is oil that is continuously circulated in a feed loop that flows between rings before being forced out removing the heat produced by the bearing. However, the lubricant's efficiency is not without a price; it is driven by the balls and is mixed which increases energy losses in the machine, particularly if the rotation speed is high. Although the loss of efficiency is fairly low and cannot be completely eliminated, the increasingly severe requirements justify consideration of this aspect of machines. Another harmful consequence of systems with a permanent feed is due to the necessity of building an oil circulation circuit including recovery scoops, pipes and a pump, with the consequence that the machine is heavier and that more energy is dissipated.

SUMMARY OF THE INVENTION

Therefore, a new type of ball bearing was necessary to be designed to overcome these restrictions and disadvantages.

In summary, the essential characteristic of the invention is the use of dynamic energy created by rotation, due to the special shape of one of the rings which is drilled with lubricant drainage orifices.

For ball bearings, this effect can be obtained with rings with two points of contact with the balls. Conventional ball bearings are made with rings with circular races clamped against the balls, which are thus in contact with the races at two diametrically opposite points, one at the center of each of them. By modifying the shape of these rings, more precisely by eliminating their central part to make them narrower, the shape of a diametric cross-section through the race becomes conical, and the balls are in contact with it at two points located on its sides. This means that the central area of each ring becomes free, and oil inlet and outlet drillings can be made in this area. Since the drillings are never covered by the balls which move away from the race at this location, there is no risk of damaging their surroundings by the occurrence of shocks, Hertz pressure or fatigue, or interrupting oil circulation at any time. It was found that the characteristics of these bearings were much improved due to better oil circulation set up. This is why the invention also allows for oil drainage outside the bearing through orifices passing through the central circumference of one of the rings. The oil inlet may be through similar orifices in the other ring or in any other way. Furthermore, drainage orifices are inclined (starting from the radial direction) in the direction of rotation of the bearing in order to improve the oil flow.

Another beneficial result of drilling drainage holes is that the lubricant is not dispersed around the bearing, but on the contrary is directed along a well defined trajectory. Therefore, it can be recovered without providing a complicated lubricant system around the bearing equipped with collection devices and an oil separator device to separate the lubricant and the air bubbles contained in it as an emulsion at the bearing outlet.

Note that the invention is applicable to roller bearings in which drainage orifices may pass through one of the ring on two lateral annular circumferences.

BRIEF DESCRIPTION OF THE DRAWINGS

The invention will be better understood with reference to the following figures attached for illustration purpose and not restrictive wherein.

DESCRIPTION OF THE PREFERRED EMBODIMENTS

Figure 1:
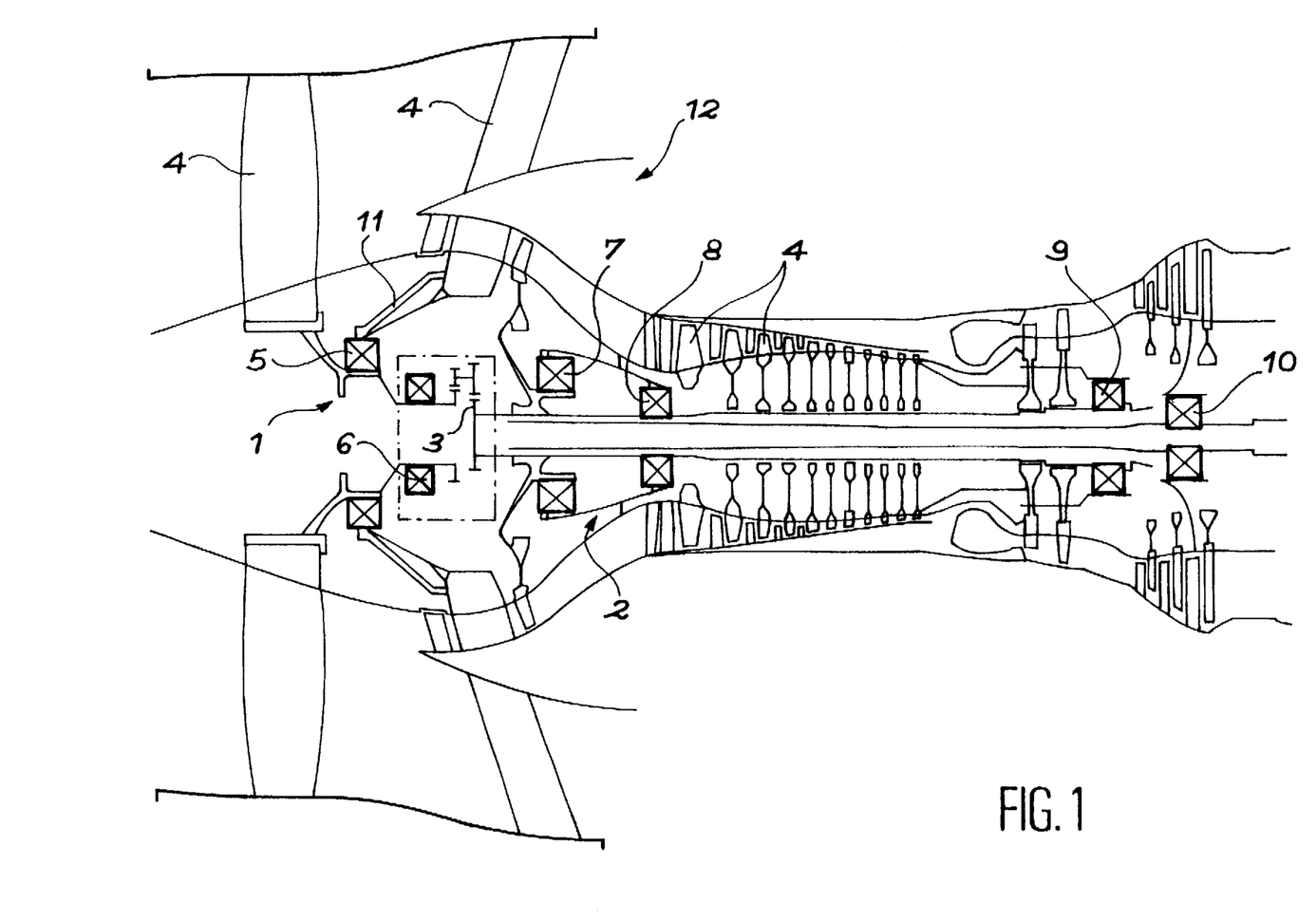
FIG. 1 is a general view of a turbojet.

FIG. 1 shows a turbojet and particularly its shaft, which is composed of a coaxial front part 1 and rear part 2, connected through a reduction gear 3 which is shown in outline only to facilitate understanding of the drawing. Parts of shafts 1 and 2 support compressor and turbine blades 4 which are rotated at different speeds by reduction gear 3. Motor performances are improved but the energy dissipated in reduction gear 3 is increased, which means that several bearings have to be added. The front shaft 1 is thus supported by a ball bearing 5 and a roller bearing 6 placed a little further back in the area of reduction gear 3; the rear part 2 of the shaft is much longer, and is supported from front to back firstly by a pair of ball bearings 7 and 8 at one end, then a pair of roller bearings 9 and 10 at the other end. The outer rings of these six bearings are fixed at the end of the journal bearing support elements 11 forming part of stator 12. Note that the efficiency of this shaft line is 0.986, with most of the losses being produced in the reduction gear 3 which is remarkable considering the large number of bearings, but the dissipated power is still large enough to require a large amount of cooling.

Figure 2:
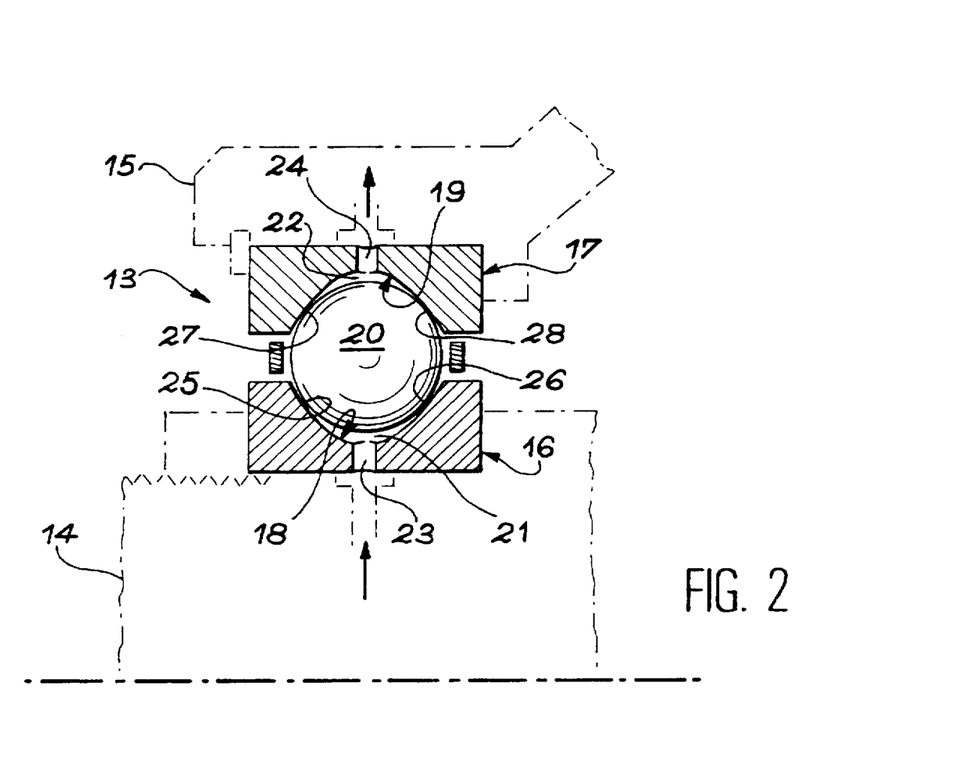
FIGS. 2 and 3 show bearings according to the invention in greater detail.
Figure 3:
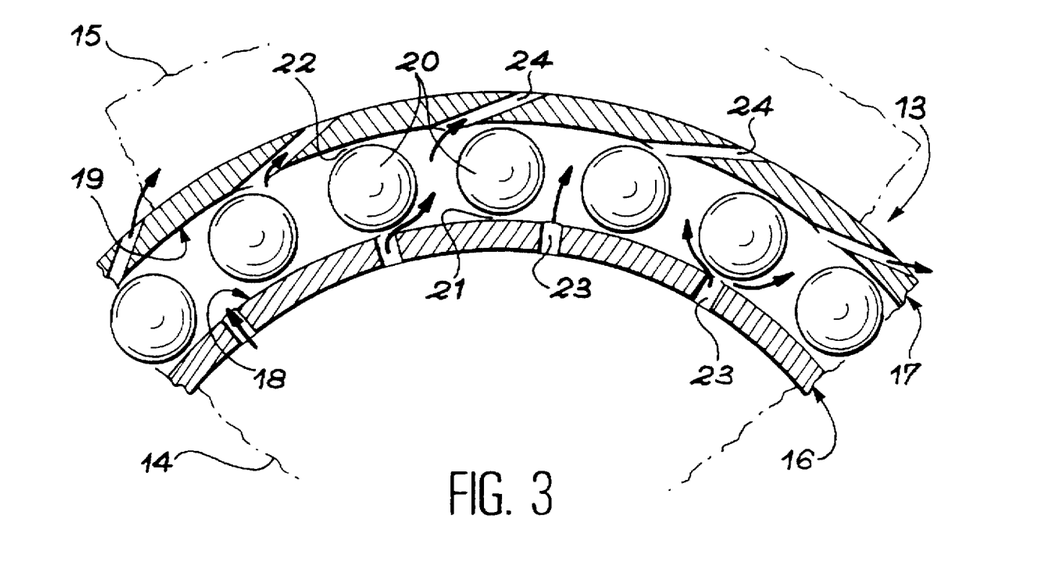

FIGS. 2 and 3 will be now discussed, which represent a bearing 13 in accordance with the invention and placed between a shaft 14 and a support part 15 by the external faces of an inner ring 16 and an outer ring 17 respectively. This bearing 13 may replace the previous ball bearings 5, 7 and 8. The opposite faces of these rings, namely the inner faces facing each other, are therefore bearing races 18 and 19 inside which balls 20 are retained. The cross-section of races 18 and 19 are not circular, but are rather conical with a vertex 21 or 22 forming part of a central circumference in which orifices 23 and 24 are formed which pass completely through ring 16 or 18. Therefore balls 20 never cover these orifices 23 and 24, but touch the inner ring 16 at two lateral contact points 25 and 26 on each side of orifices 23 and the outer ring 17 through two other lateral contact points 27 and 28, also on each side of orifices 24. Note that the orifices 24 of outer ring 17 are inclined in the direction of rotation to facilitate oil flow. These are output orifices towards which oil is forced by the centrifugal force produced by the rotation of shaft 14. This flow is compensated by oil entering through orifices 23, such that forced circulation is set up which lubricates the bearing and removes the heat produced. As shown by the arrows, oil passes around, between and at the side of balls 20, and quickly reaches the output orifices 24, remaining for a much shorter time in bearing 13 than in a conventional designed bearing. Some of the oil also leaves the bearing 13 passing between rings 16 and 17, but it is picked up by scoops using known arrangements. The oil periodically returns through bearing 13.

Figure 3A:
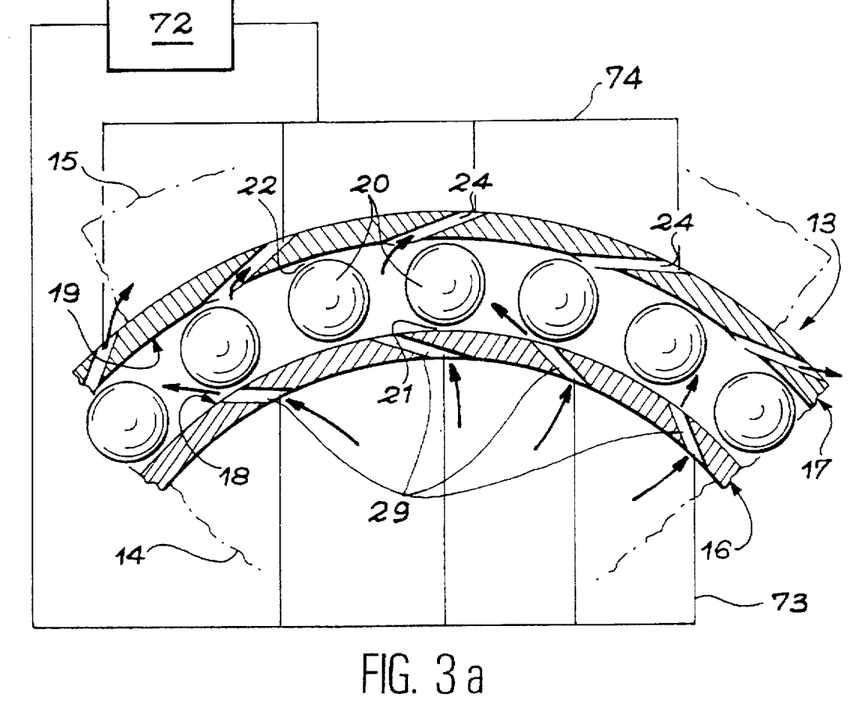
FIG. 3a shows a modification of the bearing in FIG. 3 and a lubricant return system in the bearing.

This design may be improved as shown in FIG. 3a, in which straight feed orifices 23 have been replaced by feed orifices 29 through inner ring 16 and inclined in the opposite direction to the bearing 13 direction of rotation and the balls 20 direction of motion, unlike the drainage orifices 24. The effect produced is to encourage oil circulation, by suction in this case, due to rotation of the inner ring 16 which accelerates oil towards the outside and to balls 20 that discharge oil in the bearing by moving forwards less quickly than the inner ring 16. This arrangement means that feed orifices 29 and drainage orifices 24 can be connected directly to an oil tank 72 through pipes denoted 73 and 74 respectively. The bearing can overcome an output pressure equal to about one meter head of lubricant; in this case it can circulate the lubricant itself, without the need for a pump; the oil circuit simply consists of ducts.

Figure 3B:
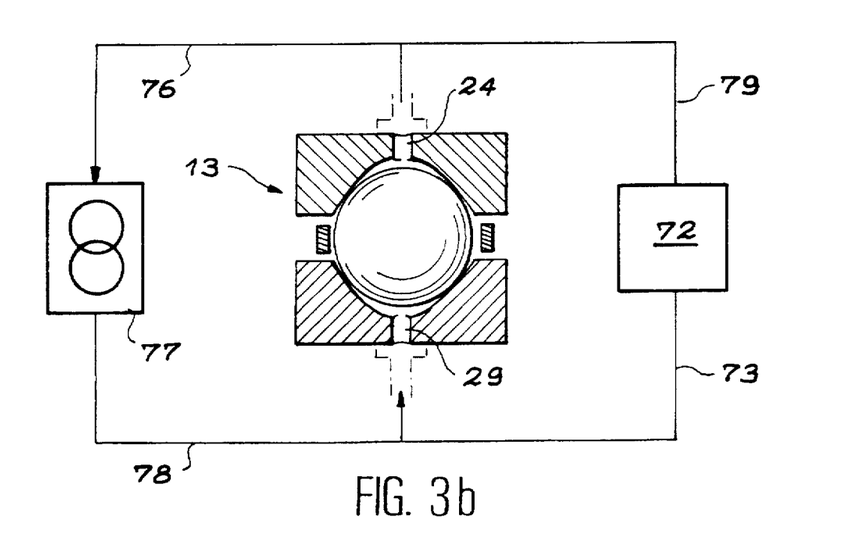
FIG. 3b shows another lubricant return system in the bearing.

If the bearing is required to operate under more severe conditions, a conventional pump lubrication would probably be used to increase the flow. The system in FIG. 3a could then be used in conjunction with a conventional device as shown in the layout in FIG. 3b; the pipe 75 leading from drainage orifices 24 forks into a main branch 76 leading to an ordinary lubrication installation 77, with a pump and a large capacity oil tank which returns oil to bearing 13 through return pipes 77 leading to intake orifices 29 and an auxiliary branch 79 leading to the small capacity oil tank 72, connected to feed orifices 29 through pipes 73. Most of the lubrication is produced by the installation 77, but if this installation shut down temporarily, tank 72 replaces it by outputting a sufficient standby flow for adequate lubrication.

The main characteristic of the invention is that oil drainage outside of the bearing 13 is facilitated through output orifices 24. Energy losses caused by mixing of the oil by balls 20 due to its viscosity are therefore lower, although they are higher than the higher friction losses caused by the four contact points per balls 20. The energy efficiency of bearing 13 is therefore better. In specific terms, temperature reductions of several tens of degrees are observed when using a bearing 13 according to the invention, instead of an ordinary bearing under the same operating conditions (for example 140° C. instead of 170° C.). In another test category, the lubrication flow through bearing 13 was reduced to return to the ordinary bearing temperature, and it has been observed that this result was not obtained until the flow was reduced by 67%, and the dissipated power was reduced by 50%. This considerable progress may be explained by a certain accumulative effect, by which a reduction in the oil flow is accompanied by a reduction of the losses by mixing and lower temperature rise making it possible to reduce the flow even further. Due to this better use of lubricant, shaft 14 can be rotated at a higher speed.

Figure 4:
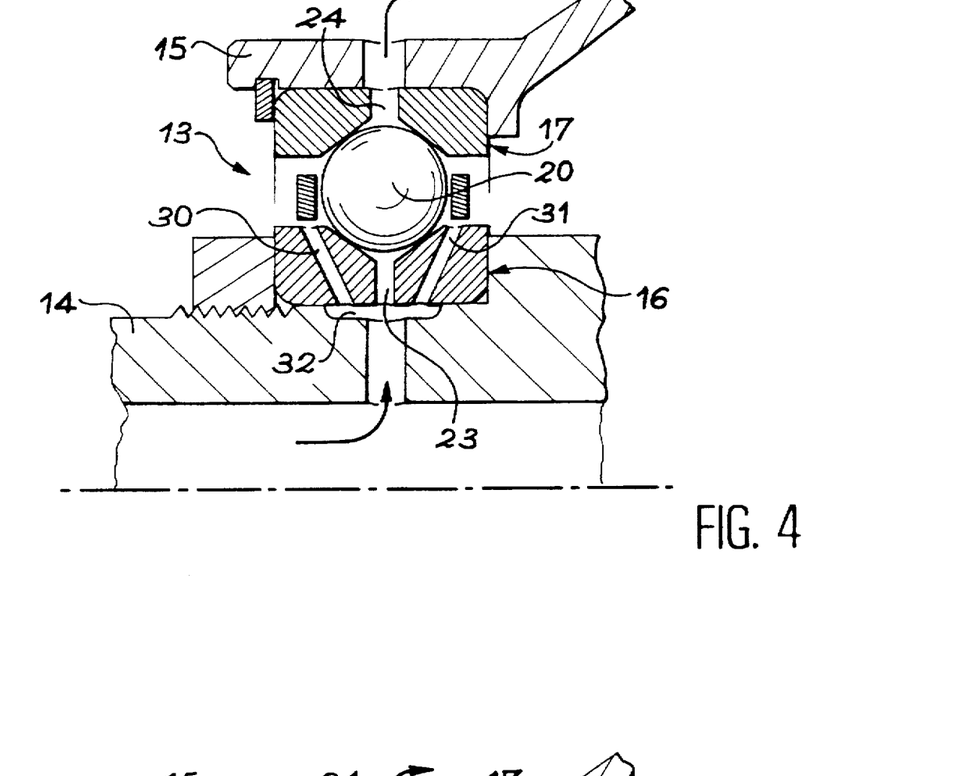
FIGS. 4, 5, 6 and 7 represent other alternate embodiments of bearings.

The implement of this principle is compatible with different embodiments. Thus, as shown in FIG. 4, the inner ring 16 may also be perforated by two rows of oblique orifices 30 and 31 which exit on each side of balls 20. Operation of the bearing modified in this way is very little different, which shows that the essential effect is due to drainage outside the bearing. However, the idea is to obtain more uniform cooling in bearing 13, by optimizing the layout of the oblique orifices 30 and 31. Shaft 14 comprises a distribution chamber 32 to distribute the oil suitably between all orifices 23, 30 and 31. Oil can be injected into a recess at the center of shaft 14 by an ejector or a pump or similar means.

Figure 5:
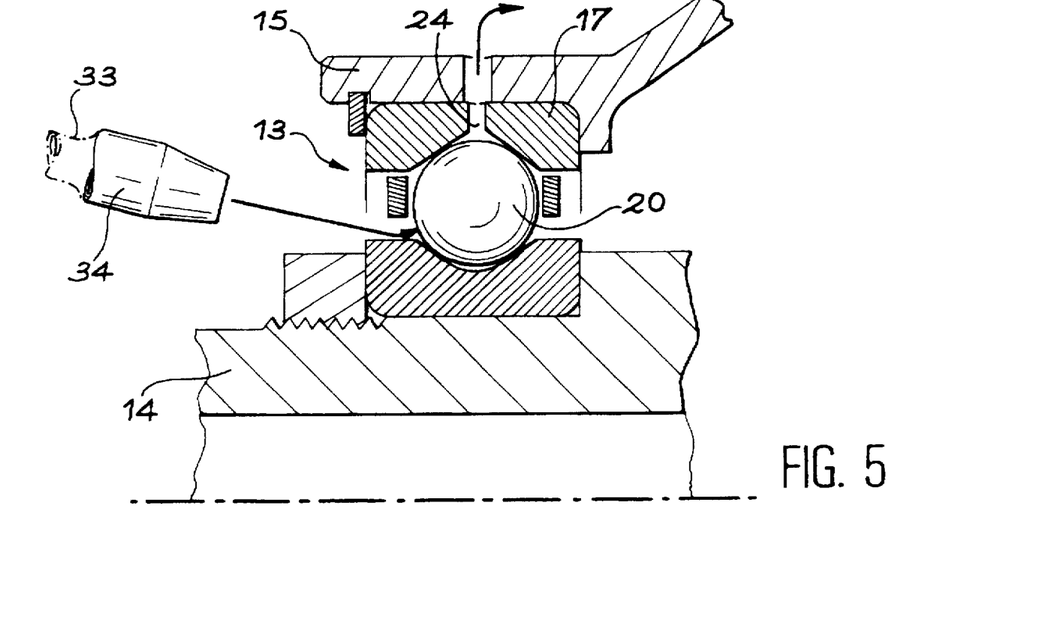

Furthermore, central orifices 23 may be omitted, and all orifices may be eliminated on inner ring 16 which would remain full. FIG. 5 illustrates this situation; oil flows in a duct 33 outside the bearing 13 and is jetted through a nozzle 34 at the end of the pipe onto balls 20 passing between rings 16 and 17. Once again, drainage takes place through orifices 24 in the outer ring 17.

Figure 6:
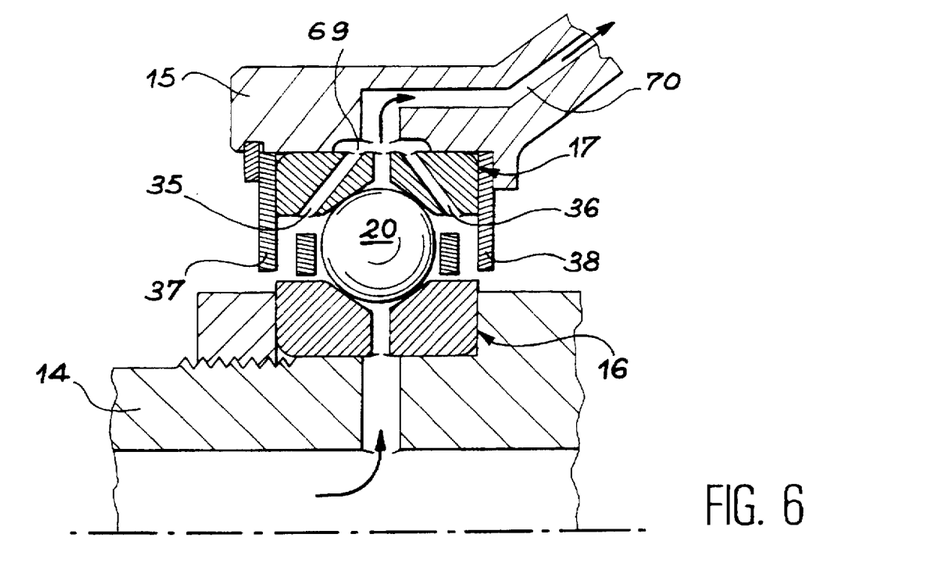
Figure 6A:
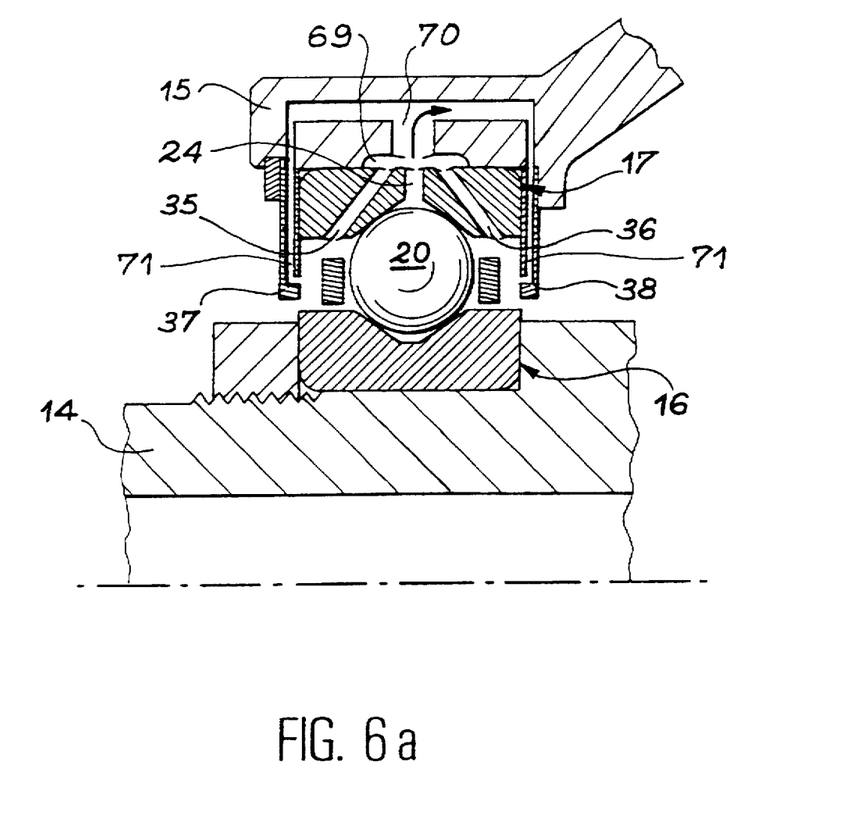
FIG. 6a shows an alternative to the embodiment in FIG. 6, FIGS. 8 and 9 show two embodiments with roller bearings.

Oblique orifices 35 and 36 may also be drilled through the outer ring 17 in two rows surrounding the central row of orifices 24, as can be seen in FIG. 6. In this design, an attempt is made to completely or almost completely eliminate oil leaks outside bearing 13. The lateral openings between rings 16 and 17 are then covered by cover plates 37 and 38 in contact with outer ring 17, and which extend almost to the inner ring 16. Since the oil flow is maintained in all cases, the bearing 13 can be rotated at higher speed without risk. Orifices 35, 36, like 30, 31, are located outside contact points 23, 26, 27 and 28. Oil drained outside the bearing through orifices 24, 35 and 36 may be returned directly to the bearing; as shown in FIG. 6a, the evacuation duct 70 in which oil circulates after being collected in an annular chamber 69 formed in the support part 15 at the outlet from orifices 24, 35 and 36, may lead to passages 71 drilled through the lateral cover plates 37 and 38 which open to balls 20 in the bearing cage. The lubrication circuit is then closed and the oil leaks are almost zero. The situation is then similar to the situation in a closed bearing lubricated with grease and which requires no maintenance except from time to time topping up the lubricant quantity contained in it. Since oil lubrication is guaranteed by the inclination of the drainage orifices, the oil circuit does not need a pump and is therefore very greatly simplified. The bearing does not need to be enclosed in a sealed containment, and itself acts as a sealing barrier along shaft 14. Obviously, the oil inlet along shaft 14 no longer exists and the inner ring 16 is intact.

It is assumed that there is only one duct 70 which then branches to drillings 71. It would also be possible to use one duct 70 for each drilling 71.

In most embodiments, drainage takes place through outer ring 17 and oil takes place through inner ring 16. It is generally preferred to drain through the stationary ring; remembering that in this case the outer ring 17 is fixed to the machine stator. The reverse situation could be envisaged with a centripetal flow from a rotating outer ring to a stationary inner ring; or it would be possible for the flow to take place from the stationary ring to the rotating ring. These situations are not as good, since it is normal to make use of the centrifugal forces imposed on the oil by a rotating feed ring to facilitate drainage, but they are not essential or they can be replaced by a higher dynamic oil splashing pressure to obtain a satisfactory result.

Figure 7:
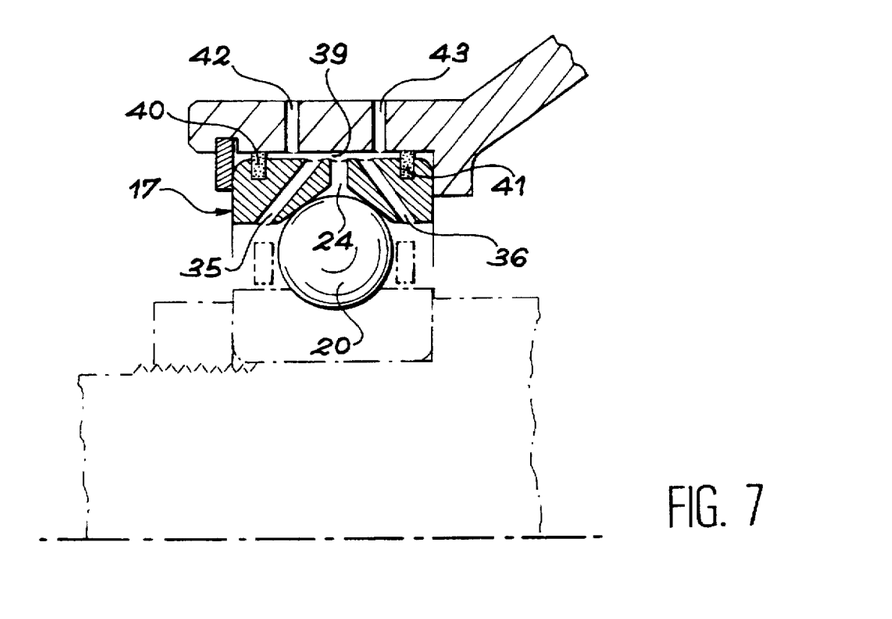

The stationary ring may be supported by an oil layer as illustrated in FIG. 7, rather than being directly supported by a solid journal bearing. The clearance 39 in front of the ring concerned (in this case the outer ring 17) is closed at the sides by two seals 40 and 41 and communicates with the outside through two rows of output orifices 42 and 43 on each side of the central row of orifices 24, but frequently the pressure is not uniform on the outer ring 17, and therefore there is an unbalanced force on the journal bearing.

This problem can be overcome once again by using oblique orifices 35 and 36 which produce a better distribution of oil between output orifices 42 and 43 and thus equalize the pressure.

Figure 8:
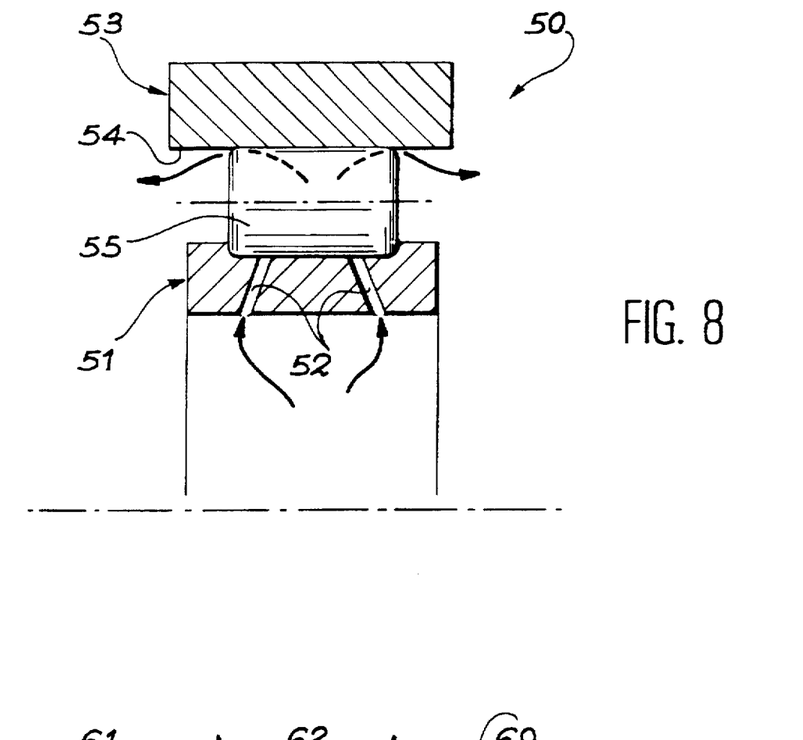

FIG. 8 illustrates a conventional roller bearing 50, in which the inner ring 51 is perforated with oil injection orifices 52 and the outer ring 53 is solid and the bearing race 54 is smooth.

Oil flows between rollers 55 to the outside, reaches the rolling race 54 and escapes to the sides of bearing 50, flowing laterally on race 54. Bearing 60 in FIG. 9 in accordance with the invention may be preferred, in which the outer ring 61 is drilled with two rows of drainage orifices 62 drilled on two lateral circumferences of the bearing race 63 at the side of shoulders 64 which retain rollers 65 and channel the oil.

Figure 9:
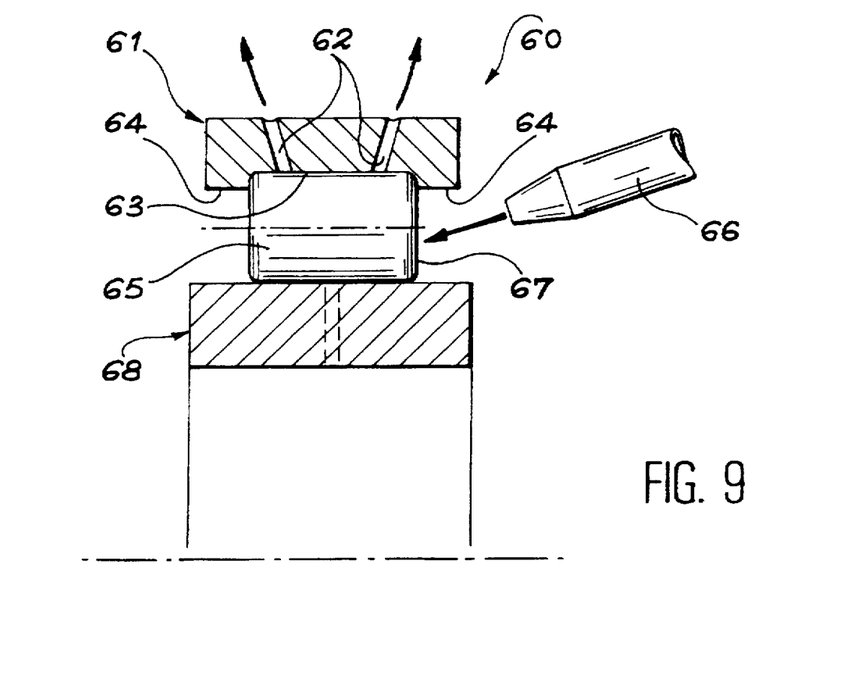

An oil ejector 66 similar to or equivalent to that in FIG. 5 may be provided for lubrication. This ejector splashes oil on one of the sides 67 of rollers 65; the oil spreads over the entire surface of the rollers 65 and on the roller races of the outer and inner rings 68 before its excess is rejected through drainage orifices 62.

Figure 10:
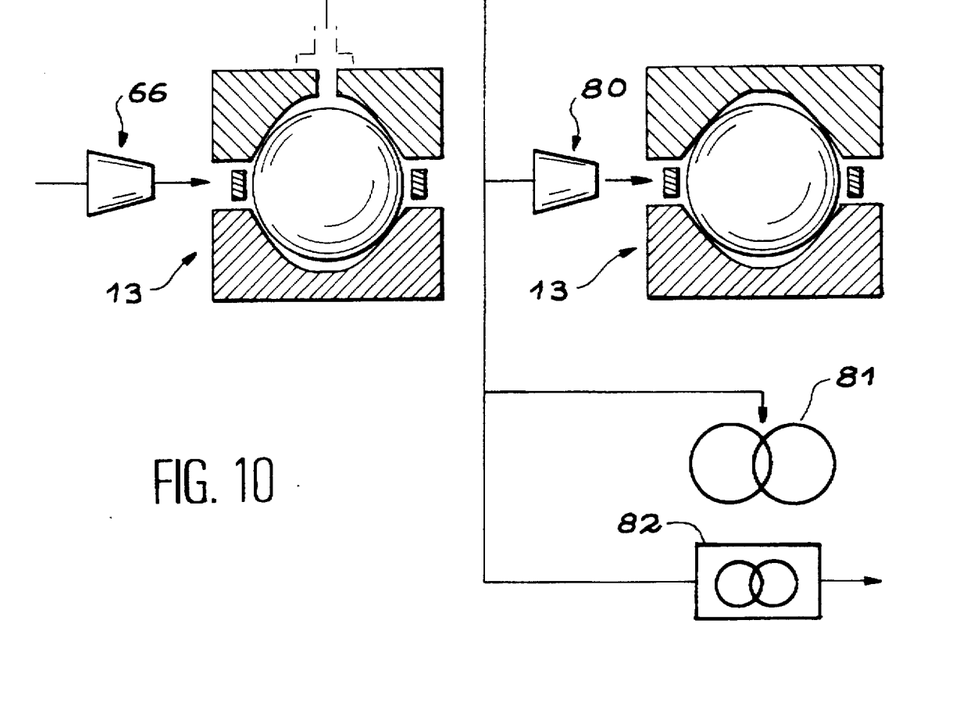
FIGS. 10 and 11 show some recycling possibilities in the installation for lubricant drained outside the bearing.
Figure 11:
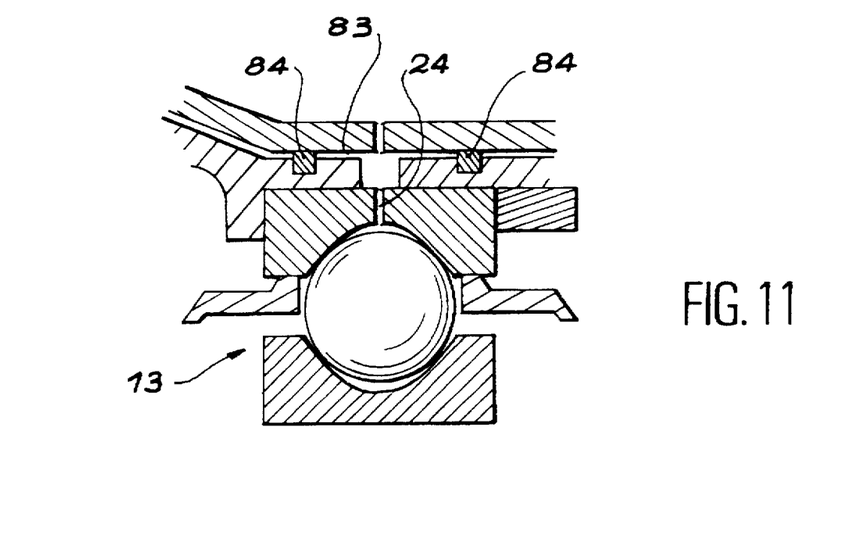

The comments made for ball bearings in the previous figures are also applicable in this case; either of the two rings 61 and 68 may be fixed or rotating, and there is a large choice of processes for injecting oil into the bearing. Thus, there may be at least one oil injection orifice (shown in dashed lines) through the inner ring 68 and leading to the center of this ring, in the lateral direction, to form this feed. The energy input to the lubricant due to the obliqueness of the drainage orifices may also be used for purposes other than returning lubricant to the same bearing; as shown in FIG. 10, the lubricant recovered through drainage orifices 24 in bearing 13 may be transferred to a lubrication ejector 80 in another bearing 13' (and similarly to a series of bearings), to a gear 81 with drip lubrication, a hydraulic motor 82 or other devices and equipment. This wide range of operational possibilities is useful in aircraft engines which have a large amount of associated equipment that has to be supplied or made to operate. FIG. 11 shows that drained oil may also supply an oil wedge in an annular fluid bearing 83 around bearing 13 between two seals 84. It is true that the pressure is fairly low, but this system deserves attention due to the uniformity of the supply and the high quality oil distribution.

We claim:

1. A bearing assembly, which comprises:

a bearing housing an inner ring and an outer ring;

a plurality of bearing elements engaged between said inner ring and said outer ring wherein at least one of said rings has a plurality of drainage orifices formed therein, said orifices draining lubricating liquid to a location outside said bearing and being inclined in a direction of rotation of said bearing to facilitate flow of the lubricating liquid.

2. A bearing assembly according to claim 1, wherein said bearing elements comprise balls, said at least one ring has a ball circulation race with two lateral contact points with the balls, located on each side of a central area thereof, and wherein the drainage orifices are located in said central area of said at least one ring.

3. A bearing assembly according to claim 1, wherein said at least one ring through which said drainage orifices pass comprises a stationary ring.

4. A bearing assembly according to claim 3, wherein said at least one ring comprises an outer ring.

5. A bearing according to claim 1, which comprises a plurality of lubricant feed orifices which are inclined in the direction of rotation of said bearing.

6. A bearing assembly according to claim 1, which comprises a return duct which passes through an oil tank wherein said return duct communicates with said orifice.

7. A bearing assembly according to claim 1, wherein a second ring of said rings has a plurality of orifices formed therein which are inclined in a direction which is opposite the direction of rotation of said bearing.

8. A bearing assembly according to claim 1, wherein one of said rings comprises a rotatable ring having a plurality of feed orifices feeding the lubricating liquid therethrough.

9. A bearing assembly according to claim 8, wherein said rotatable ring comprises said inner ring.

* * * * *

UNITED STATES PATENT AND TRADEMARK OFFICE
CERTIFICATE OF CORRECTION

PATENT NO. : 5,749,660
DATED : May 12, 1998
INVENTOR(S) : Guy F. P. DUSSERRE-TELMON, et al.

It is certified that error appears in the above-identified patent and that said Letters Patent is hereby corrected as shown below:

On the title page, Item [73], the Assignee is incorrect. It should read:

--Societe Nationale d'Etude et de Construction de Moteurs d'Aviation "Snecma", Paris, France--

Signed and Sealed this

Eighth Day of December, 1998

Attest:

BRUCE LEHMAN

Attesting Officer

Commissioner of Patents and Trademarks